(12) United States Patent
McKinley et al.

(10) Patent No.: US 9,435,838 B1
(45) Date of Patent: Sep. 6, 2016

(54) DYNAMIC MULTI-MODE RADIOMETER SYSTEM WITH QUANTIZED NOISE INJECTION FOR AUTOMATED CALIBRATION AND METHOD OF AUTOMATED CALIBRATION

(71) Applicant: LOCKHEED MARTIN CORPORATION, Bethesda, MD (US)

(72) Inventors: William Scott McKinley, Clermont, FL (US); Eugene Fischer, Clermont, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/623,581

(22) Filed: Feb. 17, 2015

Related U.S. Application Data

(60) Provisional application No. 62/007,170, filed on Jun. 3, 2015.

(51) Int. Cl.
*G01R 27/02* (2006.01)
*G01R 29/00* (2006.01)
*G01R 35/00* (2006.01)

(52) U.S. Cl.
CPC .............. *G01R 29/00* (2013.01); *G01R 35/00* (2013.01)

(58) Field of Classification Search
CPC ............................... G01R 29/00; G01R 35/00
USPC ........................................................ 324/602
See application file for complete search history.

(56) References Cited

U.S. PATENT DOCUMENTS

| | | | |
|---|---|---|---|
| 5,815,113 A | 9/1998 | Lo et al. | |
| 5,949,845 A | 9/1999 | Sterzer | |
| 6,834,991 B2 | 12/2004 | Roeder | |
| 7,034,516 B2 | 4/2006 | Ammar | |
| 7,135,848 B1 | 11/2006 | Ammar | |
| 7,199,570 B2 | 4/2007 | Ammar | |
| 7,221,139 B2 | 5/2007 | Ammar | |
| 7,239,122 B2 * | 7/2007 | Ammar ................ | G01K 11/006 324/76.14 |
| 7,250,747 B1 | 7/2007 | Ammar | |

(Continued)

OTHER PUBLICATIONS

Peng et al., Calibration Method for Fully Polarimetric Microwave Radiometers Using the Correlated Noise Calibration Standard, IEEE Trans on Geoscience and Remote Sensing, V. 46, N. 10, Oct. 2008, p. 3087-3097.*

*Primary Examiner* — Thomas F Valone
(74) *Attorney, Agent, or Firm* — Terry M. Sanks, Esq.; Beusse Wolter Sanks & Maire, PLLC

(57) ABSTRACT

Embodiments are directed to a dynamic multi-mode radiometer system and method for automated calibration of the system. In an embodiment, the system comprises a radiometer channel including an input selective low noise amplifier (LNA) and radiometer receiver. The LNA comprises a first input and second input and an output coupled to the radiometer receiver. The system includes an antenna coupled to the first input and a reference load selectively connected to the second input, the reference load configured to produce a first signal representative of a reference temperature. The system includes an internal calibrated noise generator selectively connected to the second input of the LNA and includes an internal noise source for producing a second signal representative of an injected noise temperature. The generator is configured to calibrate the radiometer receiver as a function of the injected noise temperature equalized to the reference temperature.

20 Claims, 12 Drawing Sheets

(56) References Cited

U.S. PATENT DOCUMENTS

| | | |
|---|---|---|
| 7,603,088 B2 | 10/2009 | Ammar |
| 2005/0063447 A1* | 3/2005 | Ammar ............... G01K 11/006 374/1 |
| 2005/0122254 A1* | 6/2005 | Ammar ............... G01K 11/006 342/174 |
| 2006/0121873 A1* | 6/2006 | Ammar ............... G01K 11/006 455/326 |

* cited by examiner

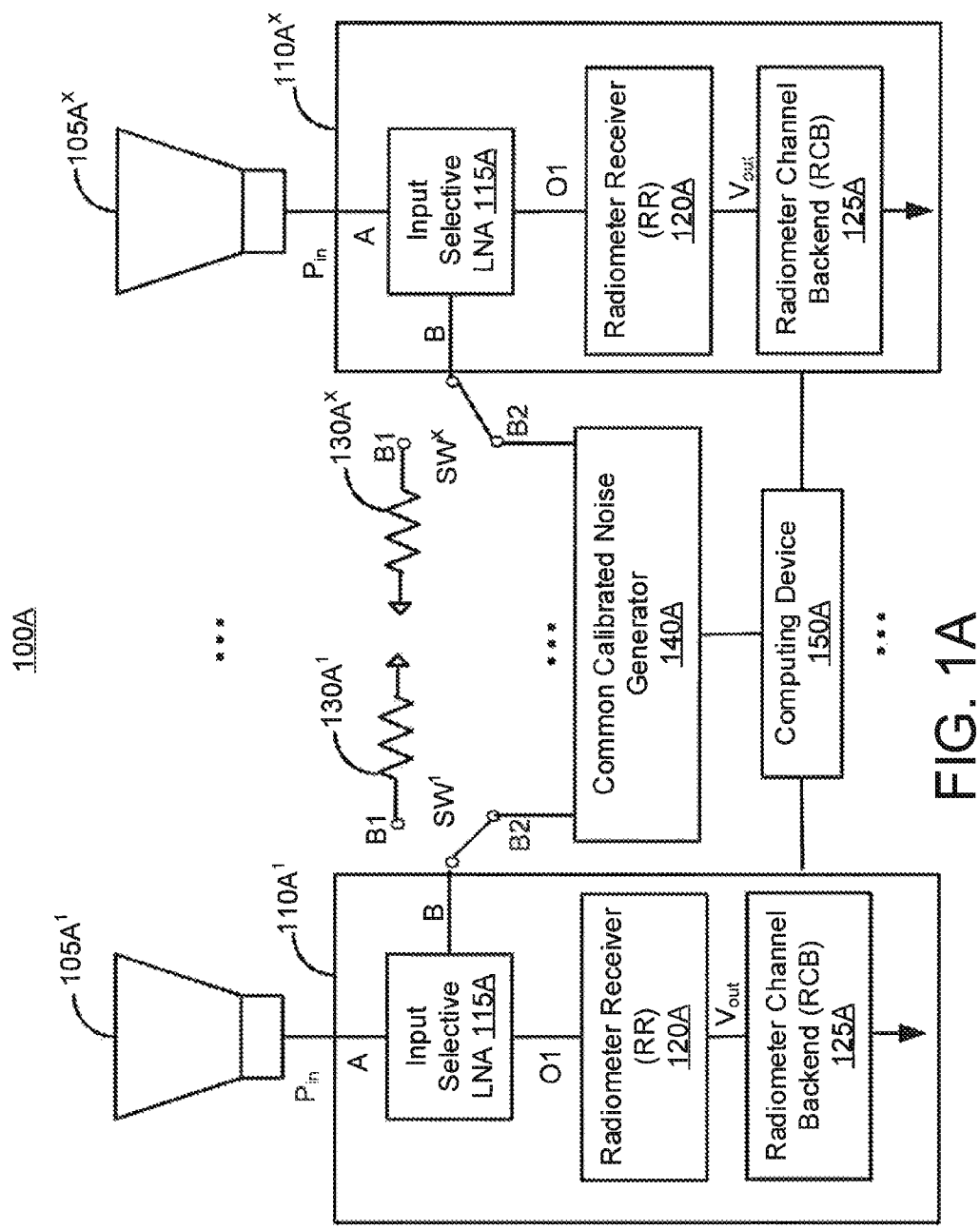

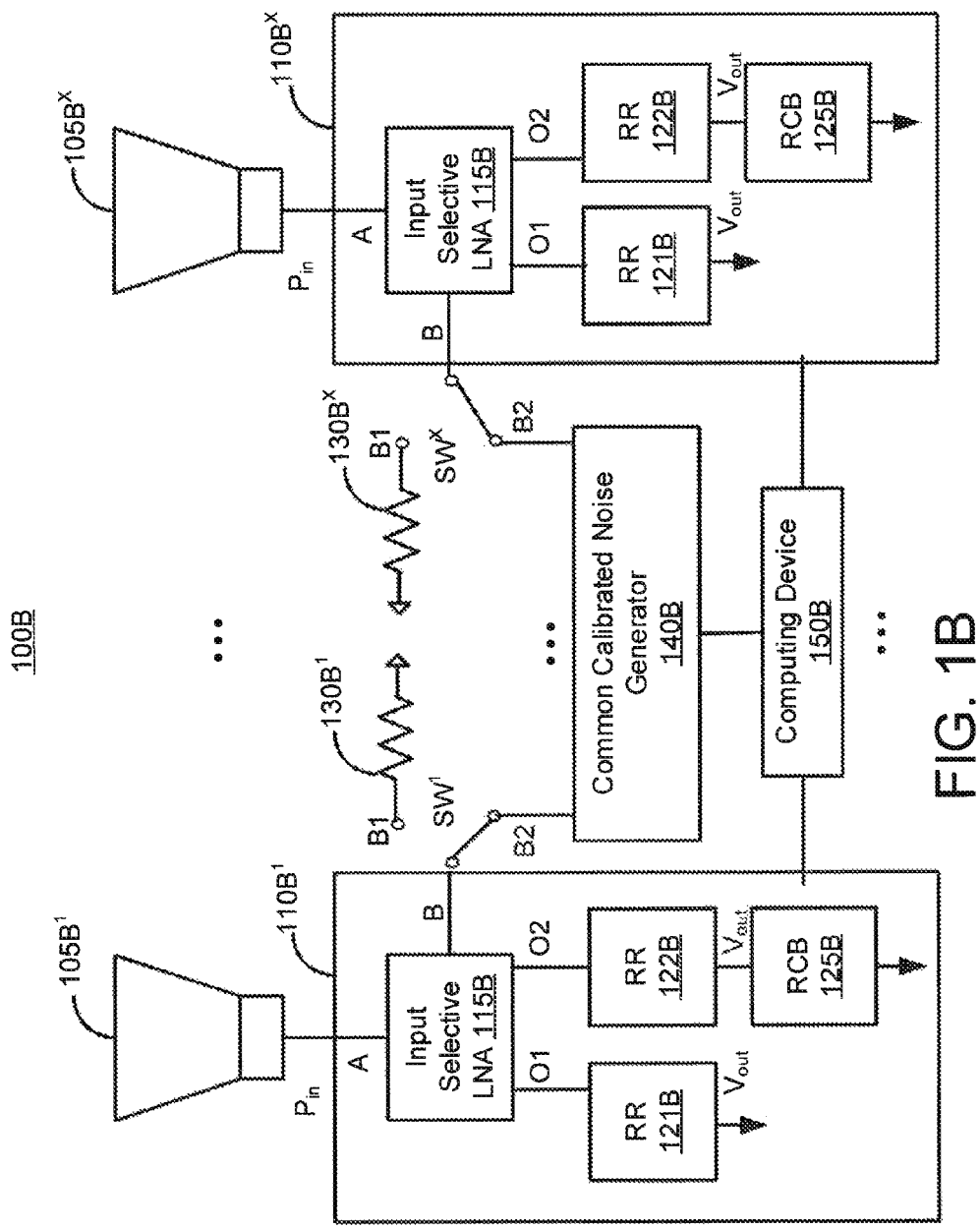

US 9,435,838 B1

DYNAMIC MULTI-MODE RADIOMETER SYSTEM WITH QUANTIZED NOISE INJECTION FOR AUTOMATED CALIBRATION AND METHOD OF AUTOMATED CALIBRATION

CROSS-REFERENCE TO RELATED APPLICATIONS

This application claims priority benefit to U.S. Provisional Patent Application No. 62/007,170, entitled "SYSTEM AND METHOD FOR PROVIDING A SWITCHLESS SELECTABLE INPUT BALANCED LOW NOISE AMPLIFIER," filed Jun. 3, 2014, incorporated herein by reference as if set forth in fill below.

BACKGROUND

Embodiments relate to radiometers and, more importantly, to a dynamic multi-mode radiometer system and method for automated calibration of the system.

A radiometer includes a high performance radio frequency (RF) receiver that translates passive millimeter wave energy into a voltage ($V_{out}$) proportional to the received RF power ($P_{in}$). As the data received by the radiometer is collected a time varying response is compiled and converted into a grey-scale video. A radiometer may be configured with multiple radiometer channels each with an RF receiver. The multiple radiometer channels can be arranged in a parallel array perpendicular to the direction of flight. Thus, a completely passive "push broom" image can be compiled into a map detailing physical features along a surface of interest (typically a geological surface).

Generally, each channel of a radiometer is calibrated by means of a reference based calibration so that the resolutions of the relative differences in the images are attainable to produce the map detail. To achieve suitable resolution of the image from the radiometer, known temperature references have to be presented to the receiver input for proper characterization and calibration with an externally presented load.

SUMMARY

Embodiments are directed to a dynamic multi-mode radiometer system and method for automated calibration of the system. In an embodiment, the system comprises a radiometer channel including an input selective low noise amplifier (LNA) and a radiometer receiver. The LNA comprises a first input and a second input and an output coupled to the radiometer receiver. The system includes an antenna coupled to the first input of the LNA and a reference load selectively connected to the second input of the LNA, the reference load configured to produce a first signal representative of a reference temperature. The system includes an internal calibrated noise generator selectively connected to the second input of the LNA and having an internal noise source for producing a second signal representative of an injected noise temperature. The generator being configured to calibrate the radiometer receiver as a function of the injected noise temperature equalized to the reference temperature.

Another aspect of the embodiments include a method comprising providing a radiometer channel including an input selective low noise amplifier (LNA) and a radiometer receiver, the LNA comprising a first input and a second input and an output coupled to the radiometer receiver. The method includes coupling an antenna to the first input of the LNA; coupling selectively a reference load to the second input of the LNA to produce a first signal representative of a reference temperature; and coupling selectively an internal calibrated noise (ICN) generator to the second input of the LNA. The ICN generator includes an internal noise source for producing a second signal representative of an injected noise temperature. The method includes calibrating the radiometer receiver as a function of the injected noise temperature equalized to the reference temperature.

Another aspect of the embodiments include a system comprising a plurality of radiometer channels, each radiometer channel including an input selective low noise amplifier (LNA) and a radiometer receiver. The LNA comprises a first input and a second input and an output coupled to the radiometer receiver. The system includes a plurality of antennas, a respective one antenna coupled to the first input of the LNA of a corresponding radiometer channel and a plurality of reference loads. A respective one reference load is coupled to the second input of the LNA of the corresponding radiometer channel and configured to produce a first signal representative of a reference temperature. The system includes an internal calibrated noise (ICN) generator selectively connected to the second input of the LNA of each radiometer channel of the plurality of radiometer channels. The ICN generator having an internal noise source for producing a second signal representative of an injected noise temperature and being configured to calibrate the radiometer receiver of each radiometer channel as a function of the injected noise temperature equalized to the reference temperature.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1A illustrates a block diagram of a dynamic multi-mode radiometer system;

FIG. 1B illustrates a block diagram of a dynamic multi-mode radiometer system with two modes performed simultaneously;

DETAILED DESCRIPTION

Figure 2A:
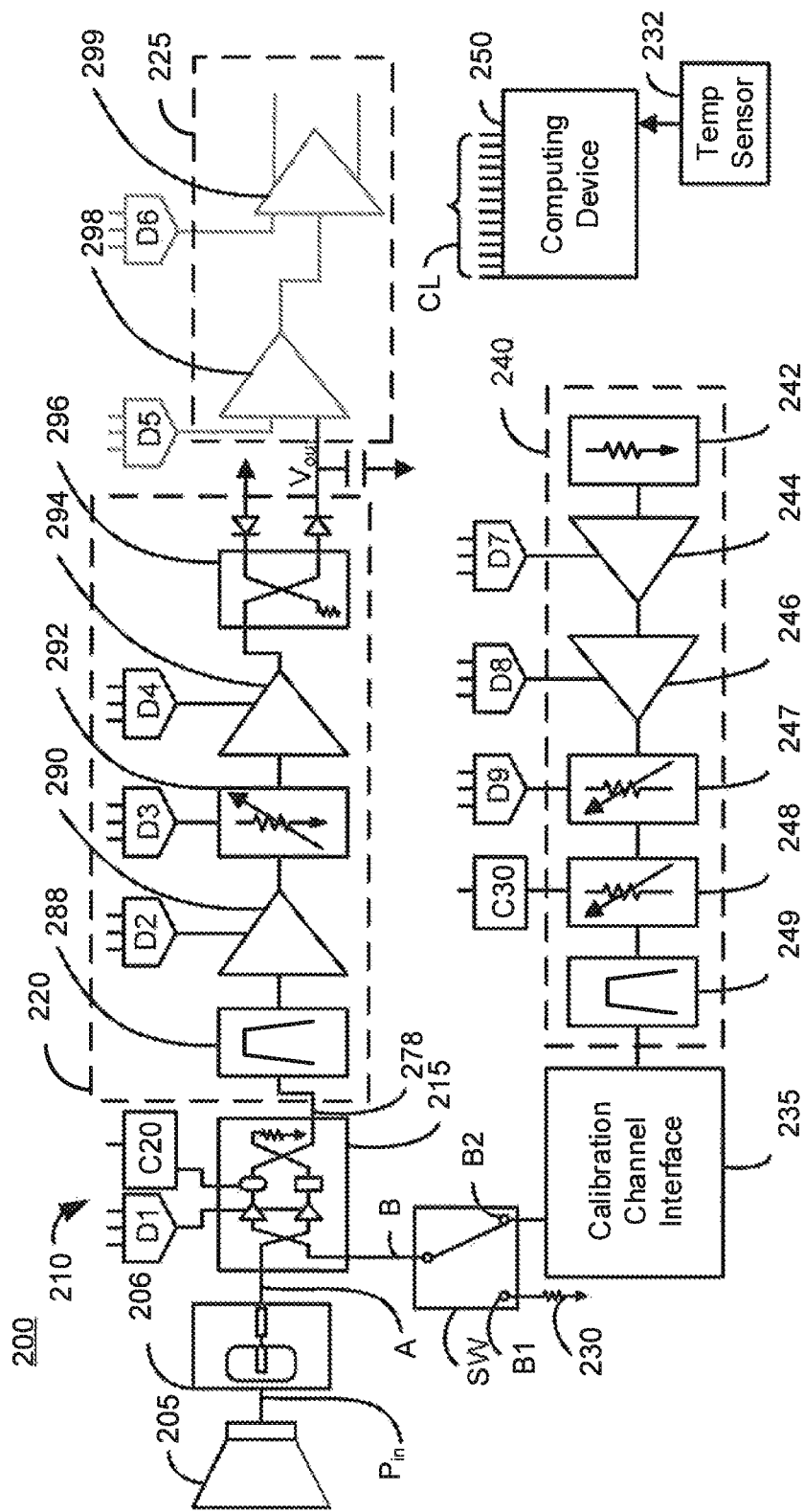
FIG. 2A illustrates a schematic diagram of a dynamic multi-mode radiometer system with a single radiometer channel with a common calibrated noise generator.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The inventors have determined that the non-integrated properties associated with an external load are inconvenient, technically immature and incompatible with tactical considerations. Specifically, the temperature calibration has to be undertaken just before flight and cannot be taken during the flight or on-the-fly. Furthermore, such calibration process is generally prohibitive for bench integrated testing (BIT). Other calibration processes use liquid nitrogen and base the calibration on 77° K. (Kelvin). The use of liquid nitrogen requires special equipment and handling just to use the liquid nitrogen.

The embodiments of the dynamic multi-mode radiometer system described herein may provide an integrated, electronic calibration reference that replaces externally referenced loads. The embodiments described herein may provide a calibration process which maintains radiometric operations and allows the radiometer system to be calibrated during flight, on-the-fly and for bench integrated testing (BIT).

In addition to supporting multiple radiometric configurations, the embodiments of the dynamic multi-mode radiometer system eliminate the requirement for an externally referenced calibration procedure. The embodiments facilitate in-flight calibration and BIT capability.

The dynamic multi-mode radiometer system may be configured to perform calibration on-the-fly without the need for liquid nitrogen or an external source. The multi-mode radiometer system may use ambient temperatures, by way of non-limiting example, internal ambient temperatures.

FIG. 1A illustrates a block diagram of a dynamic multi-mode radiometer system. 100A. The radiometer system 100A may include a plurality of radiometer channels $110A^1$ . . . $110A^X$ and a plurality of antennas $105A^1$ . . . $105A^X$. Each radiometer channel $110A^1$ . . . $110A^X$ is coupled to or associated with a respective one of the antennas $105A^1$ . . . $105A^X$. The superscript X denotes the number of radiometer channels. Each radiometer channel $110A^1$ . . . $110A^X$ may include an input selective low noise amplifier (LNA) 115A having an output O1 which may be coupled to radiometer receiver (RR) 120A. The RR 120A may be coupled to a radiometer channel backend (RCB) 125A. The LNA may include a second output as will be described in more detail in relation to FIGS. 2A, 2B and 2C. The LNA 115 is balanced and switchless with dual parallel amplifier channels.

Each RR 120A may be a high performance radio frequency (RF) receiver that translates passive millimeter wave energy into a voltage ($V_{out}$) proportional to the received RF power ($P_{in}$). As the data received by the radiometer system 100A is collected a time varying response (i.e., voltage $V_{out}$) may be compiled and converted into a grey-scale video. Calibration is needed so that the conversion into grey-scale can be accomplished as the gain fluctuates in the radiometer channel.

The input selective LNA 115A may include two inputs A and B. The first input, denoted by the letter A, may receive the received signal by the associated antenna $105A^1$ . . . $105A^X$. The second input, denoted by the letter B, may be coupled to a switch $SW^1$ . . . $SW^X$. By way of non-limiting example, each switch $SW^1$ . . . $SW^X$ may be a radio frequency (RF) switch. Each respective switch $SW^1$ . . . $SW^X$ may be coupled to an associated reference load $130A^1$ . . . $130A^X$ and, alternately, at least one common calibrated noise generator 140A. By way of non-limiting example, the reference load $130A^1$ . . . $130A^X$ may be a Dicke reference load. The system 100A may further comprise a computing device 150A. The computing device 150A synchronizes the switches $SW^1$ . . . $SW^X$, the LNAs 115A and the common calibrated noise generators 140A for the multiple modes of operation. The common calibrated noise generator 140A is an internal calibrated noise (ICN) generator.

In an embodiment, the number X of radiometer channels coupled to a single common calibrated noise generator 140A may be four (4). However, any number of radiometer channels may be coupled to the calibrated noise generator 140A such as one, two, three or more. In an embodiment, the system 100A may include 32 radiometer channels coupled in arrays of four (4) radiometer channels. By way of non-limiting example, the system 100A may include eight (8) common calibrated noise generators 140A where each common calibrated noise generator 140A is coupled to four (4) radiometer channels. In other configurations, the common calibrated noise generator 140A may be coupled to an array of two or more radiometer channels.

In an embodiment, each common calibrated noise generator 140A may be shared by an array (or subset) of radiometer channels of the plurality of radiometer channels $110A^1$ . . . $110A^X$. The common calibrated noise generator 140A is configured to electronically step temperature references (quantized levels) used to calibrate the dynamic multi-mode radiometer system 100A without an external reference (i.e., an external cold sky horn or beams switched to cold outer space ambient air). The calibration process may be performed during bench testing, as well as, on-the-fly.

The at least one common calibrated noise generator 140A is configured as an integrated, electronic calibration reference that operates at internal ambient air temperature conditions. Thus, the calibrated noise generator 140A may not require special equipment for cooling not already present for the other electronics or integrated circuitry such as, without limitation, for the plurality of radiometer channels 110A$^1$ ... 110A$^X$, a plurality of antennas 105A$^1$ ... 105A$^X$ and computing device 150A.

The multi-mode operation of system 100A will now be described. The multiple modes include two operational modes which includes a total power radiometer mode and a Dicke radiometer mode. Additionally, the multiple modes include a calibration mode.

In the calibration mode, the switch SW$^1$ ... SW$^X$ is switched between the output from the at least one common calibrated noise generator 140A at node B2 and the reference load 130A$^1$ ... 130A$^X$ at node B1 to calibrate the array of the plurality of radiometer channels 110$^1$ ... 110$^X$ associated with the at least one common calibrated noise generator 140A. Thus, the LNA 115A alternately receives a signal from node B1 and, alternately, from node B2 under the control of the computing device 150A, as will be described in more detail later, as a function of the switch state of switch SW$^1$ ... SW$^X$. The calibration mode of the radiometer system 100A will be described later in reference to FIGS. 3, 4A, 4B, 5A and 5B.

In the Dicke mode, each radiometer channel 110A$^1$ ... 110A$^X$ can adjust for gain fluctuations wherein the gain from the scene port via an associated antenna 105A$^1$ ... 105A$^X$ is adjusted based on the reference gain using the reference load 130A$^1$ ... 130A$^X$. In the Dicke radiometer mode, the switch SW$^1$ ... SW$^X$ is switched to node B1 and remains switched to node B1. The LNA 115A selectively processes the signal received at the first input A and the second input B where the second input B from node B1. The LNA is switchless and is configured to output the first input A and the second input B in phase offsets as will be described in relation to FIGS. 2A and 2B. The switch SW$^1$ ... SW$^X$ of the multi-mode radiometer system 100A may be driven in synchronism by the computing device 150A for all radiometer channels 110A$^1$ ... 110A$^X$, simultaneously.

In the total power radiometer (TPR) mode, the signal sent to the scene port, from the antenna 105A$^1$ ... 105A$^X$, is continuously passed through the LNA 115A to the RR 120A. In, the TPR mode, the signal from the scene port is available essentially 100% of the time. The TPR mode may be used for an interval of time in order to improve the Noise Equivalent Difference Temperature (NEDT) and, specifically, the image resolution.

The NEDT is defined by equation (1):

$$NEDT = \frac{T\text{ system}}{\sqrt{BW * \tau}} \qquad \text{Eq. (1)}$$

where Tsystem is the temperature of the system end-to-end; BW is the radio frequency (RF) bandwidth; and τ is the integration time constant. Tsystem may be a pre-measured noise figure of the radiometer receiver and antenna stored in memory of the computing device 150A. Tsystem may be the radiometer channel noise temperature (noise figure) which represents the noise power generated by the receiver itself, referenced at the receiver input. Temperature sensor 232 (FIG. 2A) may capture the physical radiometer module temperature. In an embodiment, one temperature sensor 232 for each channel may be located nearby the reference load, where $P_{in}$ is the RF input noise power to each channel. The noise power may be amplified and detected in detector 296. The detector 296 may behave in a linear relationship to the received noise power and produce $V_{out}$ (detector output voltage is proportional to its input noise power). The bandwidth (BW) and integration time constant (τ) are described later. In the Dicke mode, the NEDT may be multiplied by 2.

The signal on the scene port may include the received RF power ($P_{in}$). The received RF power ($P_{in}$) may be a function of a temperature transmitted from each of the antennas 105A$^1$ ... 105A$^X$ to the corresponding first input A coupled to the LNA 115A of each radiometer channel 110A$^1$ ... 110A$^X$.

In operation, all radiometer channels 110A$^1$ ... 110A$^X$ may be operated in the Dicke mode simultaneously or the TPR mode simultaneously. Thus, collectively, the radiometer channels 110A$^1$ ... 110A$^X$ produce a "push broom" image which may be compiled into a map detailing physical features along a surface of interest.

FIG. 1B illustrates a block diagram of a dynamic multi-mode radiometer system 100B. The radiometer system 100B is similar to system 100A. Thus, only the differences will be described in detail.

The radiometer system 100B may include a plurality of radiometer channels 110B$^1$ ... 110B$^X$ and a plurality of antennas 105B$^1$ ... 105B$^X$. Each radiometer channel 110B$^1$ ... 110B$^X$ is coupled to or associated with a respective one of the antennas 105B$^1$ ... 105B$^X$. Each radiometer channel 110B$^1$ ... 110B$^X$ may include an input selective low noise amplifier (LNA) 115B having a first output O1 which may be coupled to a first radiometer receiver (RR) 121B and a second output O2 which may be coupled to a second radiometer receiver (RR) 122B. The RR. 122B may be coupled to a radiometer channel backend (RCB) 125B.

The input selective LNA 115B may include two inputs A and B. The first input, denoted by the letter A, may receive the received signal by the associated antenna 105B$^1$ ... 105B$^X$. The second input, denoted by the letter B, may be coupled to a switch SW$^1$ ... SW$^X$. By way of non-limiting example, each switch SW$^1$ ... SW$^X$ may be a radio frequency (RF) switch. Each respective switch SW$^1$ ... SW$^X$ may be coupled to an associated reference load 130B$^1$ ... 130B$^X$ and, alternately, at least one common calibrated noise generator 140B. By way of non-limiting example, the reference load 130B$^1$ ... 130B$^X$ may be a Dicke reference load. The system 100B may further comprise a computing device 150B. The computing device 150B synchronizes switches SW$^1$ ... SW$^X$, LNAs 115B and the common calibrated noise generator 140B for the multiple modes of operation.

The dynamic multi-mode operation of system 100B will now be described. The multiple modes may include two operational modes and a calibration mode. The two operation modes may include a continuous total power radiometer mode and a differential Dicke radiometer mode.

In the calibration mode of system 100B, the switch SW$^1$ ... SW$^X$ is switched between the output from the at least one common calibrated noise generator 140B at node B2 and the signal associated with the reference load 130B$^1$ ... 130B$^X$ at node B1 to calibrate the plurality of radiometer channels 110B$^1$ ... 110B$^X$. Thus, each LNA 115B receives alternating signals at node B1 and at node B2 under the control of the computing device 150B, as will be described in more detail later. Each LNA 115B sends the output O2 to the RR 122B. The output of RR 122B is coupled to RCB 125B. The calibration mode of the radiometer system 100B will be described later in reference to FIGS. 3, 4A, 4B, 5A and 5B.

In the continuous total power radiometer (CTPR) mode, the signal from the scene port, via the antenna $105B^1 \ldots 105B^X$, passes through the LNA 115B to the RR 121B essentially continuously 100% of the time. The CTPR mode may be used continuously in order to improve the image resolution or the NEDT. In operation, the RR 121B may be dedicated to receive the signal from the scene port.

In the differential Dicke radiometer mode, the switch $SW^1 \ldots SW^X$ may be switched to node B1 to receive at the LNA 115B the signal from reference load $130A^1 \ldots 130A^X$ at the second input B. However, the LNA 115B is controlled to selectively receive the signal of the reference load $130A^1 \ldots 130A^X$ via the second input B and the signal at the scene port via the first input A. The signal is sent to output O2 and is processed by RR 122B. Thus, output O2 can be used for a Dicke radiometer mode or, alternately, the calibration mode.

Since each radiometer channel $110^1 \ldots 110^X$ is essentially identical, only one such radiometer channel will be described in detail. Each radiometer channel may be configured to receive microware/millimeter wave (MMW) frequency bands.

FIG. 2A illustrates a schematic diagram of a dynamic multi-mode radiometer system 200 with a single radiometer channel 210 with a common calibrated noise generator 240. The common calibration noise generator 240 is represented in the dashed box. The antenna 205 includes an output which may be coupled to the first input denoted by the reference A of the selective LNA 215 via a transition coupler 206. The input selective LNA 215 will be described in relation to FIG. 2B. The transition coupler 206 may be a waveguide to microstrip transition. The output of the LNA 215 is coupled to a radiometer receiver 220 denoted in the dashed box. The system 200 may include a computing device 250 and temperature sensor 232. The temperature sensor 232 may sense the ambient temperature of the system 200, and specifically, to record the temperature of the radiometer channel within its physical housing (not shown). The physical housing may contain the radiometer channel and the common calibration noise generator 240. The temperature sensor 232 may be coupled to computing device 250 to send the ambient temperature to the computing device 250. The computing devices may include a plurality of control lines CL.

Figure 2B:
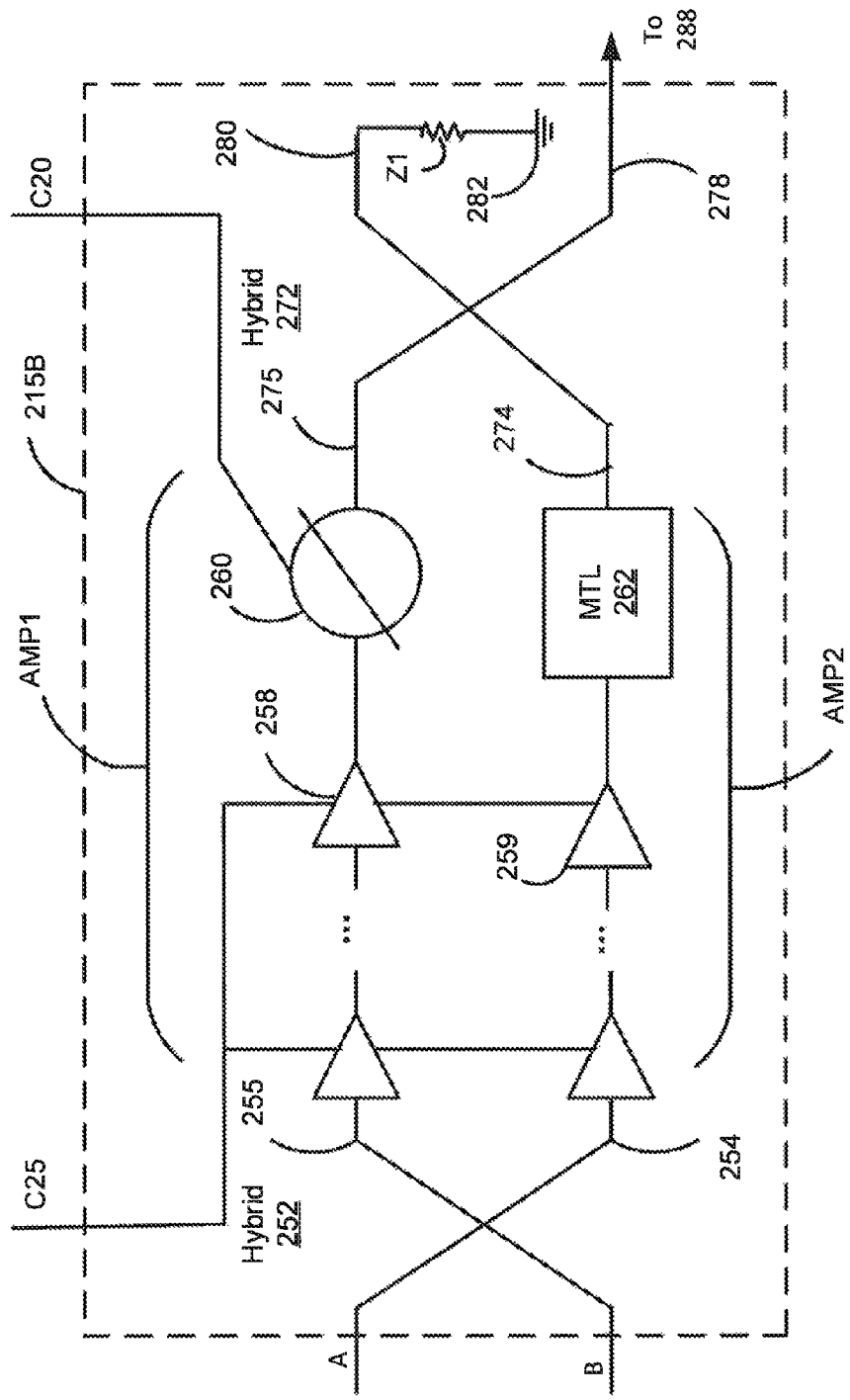
FIG. 2B illustrates a schematic diagram of the input selective low noise amplifier.

FIG. 2B illustrates a schematic diagram of the input selective low noise amplifier 215B. The input selective LNA 215B has at least one of a first amplifier 258 and a second amplifier 259 with a phase bit 260 connected to at least one of the at least first amplifier 258 and the at least second amplifier 259. The phase bit 260 may be configured to generate a phase between a first phase shift and a second phase shift at an output 278 of the amplifier the phase bit 260 is connected to with detector 296 configured to receive a signal from the amplifier the phase bit 260 is connected to, according to its phase. The input selective LNA 215 is switchless and is balanced. The phase bit 260 may be a controlled phase shifter or a phase switch. The phase bit 260 may be dynamically controlled for different modes of operation described herein.

In the Dicke mode, the output 278 includes the signal from the scene port sent to the first input A and the Dicke reference load 230 on the second input B when RF switch SW is switched to node B1. (The illustration of FIG. 2A shows the switch SW tied to node B2. The phase bit 260 is variable.

Alternately, in the calibration mode, the output 278 may output the signal representative of temperature reference of the Dicke reference load 230 and the signal representative of the calibration injection noise from calibrated noise generator 240, where the signals are phase shifted by the phase bit 260.

In the TPR mode, the output 278 produces the signal representative of the signal from the scene port received by antenna 205 and sent to first input A.

Turning to the rest of the radiometer channel 210, output 278 from the input selective LNA 215 passes through a filter 288. The filter may be a bandpass filter and may be configured to determine a desired RF bandwidth (BW) of the radiometer channel. The bandpass filter may be a microstrip bandpass filter. The bandpass filter may suppress out-of-band noise and remove out of band gain contributions.

The filter output then passes through amplifier 290, at least one variable attenuators 292, amplifier 294 and then to a detector 296. By way of non-limiting example, the at least one attenuator 292 may be a variable analog attenuator. In an embodiment, there may be two or more variable attenuators 292. For example, another variable attenuator may be after amplifier 294 and before detector 296.

The detector 296 may be a square-law detector that produces a DC output directly proportional to the receiver's input noise power. The detector 296 may include one or more detector diodes. The square-law detector may be a full cycle, balanced, antiparaliel diode, square-law detector that produces a DC output voltage $V_{out}$ directly proportional to the receiver input noise power. In an "analog configuration" the subsequent analog RC integrator serves as a low pass filter that smoothes the detector output and/or establishes the analog integration time constant ($\tau$), for example, $\tau$ may equal 15 milliseconds. In a selectable "digital configuration," the detector 296 may allow raw detector data to be recorded and subsequently conditioned at whatever integration time is desired.

Output from the detector 296 is provided to an amplifier 298. A capacitor may be connected between the detector 296 and amplifier 298. The amplifier 290 and amplifier 294 may be low noise amplifiers (LNAs). The analog attenuators may optimize the RF detector response, and may also be used to mitigate temperature induced changes in overall RF gain.

Amplifier 298 may be coupled to amplifier 299. The amplifiers 290, 298, 299 and attenuator 292 may receive control signals from one or more control lines CL of the computing device 250 via digital-to-analog converters D2, D3, D4, D5 and D6. The computing device 250 may control synchronization and gain of one or more amplifiers and attenuators of the system 200.

In operation, the temperature sensor 232 may capture the temperature in the physical housing of the at least one radiometer channel and the calibrated noise generator 240. In an embodiment, a housing may be provided for an array of radiometer channels and the calibrated noise generator shared by the array, described in relation to FIG. 6. The temperature is sensed in each housing. Knowing the housing temperature allows adjustment (by the computing device 250) of the overall radiometer receiver gain variation via the one or more amplifiers (i.e., amplifiers 290 and 294) and at least one attenuator (i.e., attenuator 292). In an embodiment, the amplifiers may have an approximate gain variation of 0.015 dB/° C. per amplification stage. The RF gain of the radiometer receiver 220 per temperature may be set to a constant. Thus, the computing device 250 may adjust the one or more amplifiers (i.e., amplifiers 290 and 294) and/or at least one attenuator (i.e., attenuator 292) as the temperature changes so that the constant is maintained. The RF input power level ($P_{in}$ from antenna 205, for example) may be amplified and detected through a square-law detector that produces a DC output $V_{out}$ directly proportional to the receiver's input noise power.

The amplifier 298 and amplifier 299 may be part of radiometer channel backend 225. The amplifier 298 may be used to adjust the offset associated with the lowest denominator of the radiometer channel array. Amplifier 299 may be used to adjust the slope of the sensitivity curve.

Here the input RF port typically connected to a Dicke reference load is instead connected to an RF switch SW that provides selectivity between 1) a Dicke reference load 230 and 2) a calibrated noise generator 240 with controls that will facilitate electronically stepped temperature references used to calibrate the radiometer channel 210 without an external reference. By way of non-limiting example, the reference load 230 may be a blackbody source. The switch SW may be a monolithic microwave integrated circuit (MMIC) switch.

In an embodiment, the common calibrated noise generator 240 is configured to provide a noise injection technique for use with an electronically adjustable Dicke temperature reference load for calibration and operation of the radiometer system 200. The input selective LNA 215 may allow for electronic elements or integrated circuits to be included for the calibration function without additional input losses. The calibrated noise (CN) generator 240 will now be described in detail.

The CN generator 240 may include a noise source 242. The noise source 242 may be coupled to an amplifier 244. The amplifier 244 may be coupled to a second stage amplifier 246. The second stage amplifier 246 may be coupled to an analog attenuator 247 which in turn is coupled to a digital attenuator 248. The analog attenuator 247 is hereinafter referred to as a "CAL analog ATTN 247" and the digital attenuator 248 will hereinafter be referred to as a "CAL digital ATTN 248". The CAL digital ATTN 248 is coupled to a filter 249. The output of filter 249 may be coupled to a calibration channel interface 235. The calibration channel interface 235 may be used to couple an array of radiometer channels to node B2. In an embodiment, the calibration channel interface 235 may be a signal splitter that splits the signal between radiometer channels simultaneously.

The amplifier 244, amplifier 246, and CAL analog ATTN 247 are controlled by computing device 250 via control signals from control lines CL to digital-to-analog converters D7, D8 and D9, respectively. A control signal or control word is sent to the CAL digital ATTN 248 on control line C30.

The Dicke reference load 230 may have a plurality of temperature reference terminations for different baseline temperature references.

In operation, the reference load 230 produces a first signal configured to produce a first signal representative of at least one reference temperature. The calibrated noise generator 240 produces a second signal representative of an injected noise temperature wherein the generator 240 is configured to calibrate the at least one radiometer receiver as a function of the injected noise temperature equalized to the at least one reference temperature.

The generator 240 may be adjusted to match (equalize) the signal representative of the known base line temperature of the reference load 230 (by means of Dicke switching the RF switch input to the balanced LNA 215) to the signal representative of the generator's output such as from filter 249. Once the generator 240 is equalized, the CAL digital ATTN 248 may then be stepped through a plurality of quantization levels to provide well characterized temperature increments that can be used to equalize each of the independent radiometer channels (i.e., radiometer channels $110A^1 \ldots 110A^X$ or radiometer channels $110B^1 \ldots 110B^X$) relative to one another and with respect the known temperature reference and provide a sensitivity curve.

Referring again to FIG. 2B, the input selective LNA 215B may include a first input A and a second input B coupled to a first hybrid device 252 and a second hybrid device 272. The first hybrid device 252 and the second hybrid device 272 may be coupled to first and second parallel amplifier channels AMP1 and AMP2. The first hybrid device 252 may be located at the input side of the first and second parallel amplifier channels AMP1 and AMP2. The second hybrid device 272 may be located at the output side of the first and second parallel amplifier channels AMP1 and AMP2.

The first hybrid device 252 may include the first and second inputs denoted by A and B. The first hybrid device 252 may include first and second outputs 254 and 255. The first output 254 may be coupled to the second amplifier channel AMP2. The second output 255 may be coupled to the first amplifier channel AMP1. The first amplifier channel AMP1 may include one or more first amplifiers 258. The second amplifier channel AMP2 may include one or more second amplifiers 259. The first amplifier channel AMP1 may further include a phase bit 260 which may be coupled to the second hybrid device 272. The second amplifier channel AMP2 may include a matched termination load 262 which may be coupled to the second hybrid device 272.

The second hybrid device 272 includes first and second inputs 274 and 275. The first input 274 may be coupled to the second amplifier channel AMP2 and, specifically, to the output of the matched termination load (MTL) 262. The second input 275 of the second hybrid device 272 may be coupled to the first amplifier channel AMP1 and, specifically, to the output of the phase bit 260.

The second hybrid device 272 may include first and second outputs 278 and 280. The first output 278 may be coupled to the radiometer receiver 220. The second output 280 of the second hybrid device 272 may be coupled to a termination load port 282 via load Z1.

It should be recognized that in practical applications, the low noise amplifier (i.e., LNA 215B) may include many other components and features that have not been expressly illustrated in FIG. 2B, which are not included herein for sake of brevity. However, as a non-limiting example, the one or more first amplifiers 258 may include a plurality of series coupled amplifiers in the first amplifier channel AMP1. The one or more second amplifiers 259 may include a plurality of series coupled amplifiers in the second amplifier channel AMP2. In FIG. 2A, the LNA 215 shows a signal amplifier in the parallel amplifier channels AMP1 (FIG. 2B) and AMP2 (FIG. 2B). Otherwise, LNA 215 of FIG. 2A is essential identical to LNA 215B of FIG. 2B.

Though the term "hybrid device" is used herein, this term is not used to be limiting as other terms may be used, such as, but not limited to, "hybrid," "hybrid coupler," etc., wherein none of these terms are meant to designate some form of limitation not expressly stated, and claimed, herein.

As used herein, the first input A may be referred to as a scene port while the second input B may be referred to as a reference load port. The scene port (i.e., first input A) may be configured to receive information about a sensed scene whereas the reference load port (i.e., second input B) may be configured to receive information about a baseline or reference temperature signal, which may be at least one known temperature. Alternately, the first input A may be the reference load port while the second input B may be the scene port. In an embodiment, one of the inputs may be one type of port while the other input may be the other type of port. However, in other embodiments the roles of the ports may be reversed or both ports may provide sensed scene data or both providing reference data. Thus, those skilled in the art will recognize that the terms "scene port" and "reference load port" are simply used to identify the two ports.

By simultaneously sensing and comparing the information received at the scene port (i.e., first input A) with that received at the reference load port, the radiometer channel 210 may determine and output the temperature of the sensed scene or, in the alternative, to output the temperature of the baseline or reference of the reference load port.

The input selective LNA 215B may be used to sense the electromagnetic radiation, and therefore the temperature, of sensed scenes such as a portion of the earth (e.g., a field, a river, a lake, etc.), a portion of the heavens (a patch of sky or space), a structure (e.g., a building, a road or bridge, etc.), a portion of the human body, and so on. Contrast in discernible temperatures within the image provides a means of detecting what might not normally be visible.

The first hybrid device 252 may be generally interposed between the scene port and reference load port on one side and the one or more first amplifiers 258 and the one or more second amplifiers 259 on the other side. Non-limiting examples of the first hybrid device 252 may comprise a Lange coupler, a quadrature coupler (or hybrid), or some other suitable coupling device. As such, the first hybrid device 252 may be able to function as a four-port system. As a non-limiting example of the four-port system, the first hybrid device 252 may provide a first port (top, left) coupled to the scene port (i.e., the first input A), a second port (top, right) coupled to the one or more first amplifiers 258, a third port (bottom, right) coupled to the one or more second amplifiers 259, and the fourth port (bottom, left) coupled to the reference load port (i.e., the second input B). It should be recognized that the relative phase difference between the first port of the first hybrid device 252 and the fourth port may be zero degrees. In addition, the relative phase difference between the first port of the first hybrid, device 252 and the third port may be ninety degrees. The amplitude of the signal at the various ports may remain the same.

The amplification of the at least one amplifier 258 and the at least one amplifier 259 may be controlled by the computing device 250 where computing device 250 delivers control signals on control line C25 of the control lines CL. The control signal may be digital and converted to analog via digital-to-analog converter D1. The phase bit 260 may be control by the computing device 250 on control line C20.

Functionally, the first hybrid 252 may be configured to divide each received signal, whether from the first input A or the second input B, such that half is relayed to the one or more first amplifiers 258 and the other half is relayed to the one or more second amplifiers 259. This will be more fully explained below. The one or more first amplifiers 258 on amplifier channel AMP1 and the one or more second amplifiers 259 on the second amplifier channel AMP2 collectively may form a balanced or differential amplifier. The one or more first amplifiers 258 and the one or more second amplifiers 259 may be in two parallel gain stages such that gain is equalized in the two parallel gain stages. In an embodiment, each of the one or more first amplifiers 258 and the one or more second amplifiers 259 may be a low-noise amplifier or other suitable amplification device.

The phase bit 260 is generally disposed on the opposite (output) side of the one or more first amplifiers 258 relative to the scene and reference load ports. However, the phase bit 260 may be disposed on the opposite (output) side of the one or more second amplifiers 259. In other words, the phase bit 260 may be disposed after the initial amplification stage provided by the one or more first amplifiers 258 or the one or more second amplifiers 259 in the input selective LNA 215.

The phase bit 260 is shown as a single phase bit. However, the phase bit 260 may be implemented in one or the other of the two amplifier channels AMP1 or AMP2. In an embodiment, the phase bit 260 may be implemented in discrete, lumped element fashion (e.g., using capacitors and inductors) or in a distributed fashion (e.g., using transmission lines). It should be recognized that the phase bit 260 may also be formulated from other components, circuits, modules, etc., to generate the desired phase shift. In addition, the phase bit 260 may be controlled by, as a non-limiting example, a single simple, single ended voltage source.

As a result of using the phase bit 260, vector arithmetic associated with the input and output hybrid combiners, the phase bit 260 may produce RF phase vectors that may combine to provide the desired path selectively. To maintain optimal RF performance, this function may be located after the initial amplifier stage. Thus, placement as disclosed provides for selectable input directivity without impact on performance. Additionally, control of the phase bit 260 may be achieved through a single, simple, single ended voltage connection.

Thus, the phase shifter function may be implemented in field-effect transistor ("FET") form where the functional addition is MMIC process compatible. Other implementations may include, but are not limited to, capacitors and inductors, transmission lines, etc.

In an embodiment, the phase bit 260 in the input selective LNA 215 may be a simple one hundred eighty degree phase bit. Therefore, the phase bit 260 may be able to change the phase of a received signal by up to one hundred and eighty degrees. The phase bit 260 may change phase from, or between, a first phase or phase shift to a second phase or phase shift. As a non-limiting example, the first phase shift may be a zero degree phase shift and the second phase shift may be a one hundred and eighty (180) degree phase shift. A signal passing the phase bit 260 may be effectively inverted by the phase bit 260. As will be more fully explained below, the phase bit 260 may permit the directivity of the balanced four-port amplifier to be changed without deleteriously impacting RF performance.

The second hybrid device 272 is generally interposed between the one or more first amplifiers 258 and the one or more second amplifiers 259 on a first side (i.e., the input side) and the matched termination load port 282 and the output 278 on a second side (i.e., the output side). In an embodiment, the second hybrid device 272 may be, as a non-limiting example, a Lange coupler, a quadrature coupler (or hybrid), or some other suitable coupling device. As such, the second hybrid device 272 may be considered as a four-port system. As an non-limiting example of the four-port system, the second hybrid device 272 may provide a first port (top, left) coupled to the one or more first amplifiers 258, a second port (top, right) coupled to the matched termination load port 282 on output 280, a third port (bottom, left) coupled to the one or more second amplifiers 259, and the fourth port (bottom, right) coupled to the output 278. In this configuration, it should be recognized that the relative phase difference between the first port of the second hybrid device 272 and the fourth port is zero degrees. In addition, the relative phase difference between the first port of the second hybrid device 272 and the third port may be ninety degrees. The amplitude of the signal at the various ports may remain the same.

In contrast to the first hybrid device 252 which is configured to divide received signals, the second hybrid 272 is generally configured to recombine the received signals, whether from the one or more first amplifiers 258 or the one or more second amplifiers 259. This combination of signals will be more fully explained below.

The matched termination load port 282 via load Z1 may function to balance the second hybrid device 272. The load Z1 may be, as a non-limiting example, a resistor or other component capable of providing impedance. In an embodiment, the load Z1 may be a fifty Ohm (50Ω) resistor. The output 278 may selectively provide the signal received at the scene port or the signal received at the reference load port. Therefore, it should be recognized that the input selective LNA 215B may comprise a single output port where the LNA 215B is configured to effectively synchronize between outputs as desired.

In operation, the signal at the first input A (sometimes referred to as "signal A") may be present at the scene port and the signal at the second input B (sometimes referred to as "signal B") may be present at the reference load port. The first hybrid device 252 may pass fifty percent (50%) of signal A at 0 degrees (°) to the one or more first amplifiers 258 and 50% of signal A at 90° to the one or more second amplifiers 259. Likewise, the first hybrid device 252 passes 50% of signal B at 0° to the one or more second amplifiers 259 and 50% of signal B at 90° to the one or more of the first amplifiers 258. Therefore, the one or more first amplifiers 258 may receive 50% of signal A at 0° and 50% of signal B at 90° and the one or more second amplifiers 259 may receive 50% of signal A at 90° and 50% of signal B at 0°.

Next, the phase bit 260 may be toggled between a zero degree state and a one hundred and eighty degree state. When the phase bit 260 is in the zero degree state, the output at the output 278 may be the signal A. In contrast, when the phase bit 260 is in the one hundred and eighty degree state, the output at the output 278 may be the signal B.

When the phase bit 260 is in the zero degree state, the second hybrid device 272 may pass 50% of signal A at 90° and 50% of signal B at 180° from the one or more first amplifiers 258 and 50% of signal A at 90° and 50% of signal B at 0° from the one or more second amplifiers 259 to the output 278. Because 50% of signal B at 180° and 50% of signal B at 0° nulls or may cancel each other out, the output at the output 278 may become 50% of signal A at 90° plus another 50% of signal A at 90°, or simply all of the signal A at 90°.

Likewise, when the phase hit 260 is in the one hundred and eighty degree stage, the second hybrid device 272 passes 50% of signal A at 270° and 50% of signal B at 0° from the one or more first amplifiers 258 and 50% of signal A at 90° and 50% of signal B at 0° from the one or more second amplifiers 259 to the output 278. Because 50% of signal A at 270° and 50% of signal A at 90° may null or cancel each other out, the output at the output 278 becomes 50% of signal B at 0° plus another 50% of signal B at 0°, or simply all of the signal B at 0°. So, depending on the state of the phase bit 260, the output of the output 278 may be signal A or signal B.

The phase switched, balanced LNA configuration described above for the radiometer channel is a first stage and may facilitate switching between the available inputs ports without the associated losses of a typical RF switch. If the modulation frequency is high enough, in comparison with the gain instability frequency, then it may be possible to detect the noise signal without impact of the long wave temperature induced gain fluctuations. Since the antenna temperature may be observed only half of the time (i.e., 50%), the sensitivity in the Dicke mode is reduced by a factor of two in contrast to a total power radiometer mode. The detected voltage requires further amplification in order to reach suitable levels for the analog-to-digital converters used in the data processing. This amplification may be carried out with a video amplifier, which provides high gain.

The above description of the signal generation at output 278 may vary based on the LNA 215B configuration. For example, a phase bit 260 by be placed on both parallel channels AMP1 and AMP2 at the output of the at least one amplifier 258 and 259, respectively.

Alternately, the phase bit 260 may be in amplifier channel AMP2. The LNA 215B may be a "phase vectored" balanced amplifier capable of providing switch functionality by means of a phase bit that, in conjunction with an input and output 90 degree hybrids, effectively vectors either of the two desired inputs to an output port. In an embodiment of FIG. 2C, the first input A is the antenna input which is amplified and may be generally (continuously) present at output 278. The second input B is the reference Load/CAL signal input which is amplified and selectively present at output 280 depending on the switch SW. When controlling phase bits 260 and 261, input signals A or B can be switched to either one of the two outputs 278 or 280. The embodiment which allows either of A or B to be present at outputs 278 or 280 may ensure that millimeter wave elements are exercised in the calibration mode, the continuous total power radiometer mode and the differential Dicke radiometer mode.

Figure 2C:
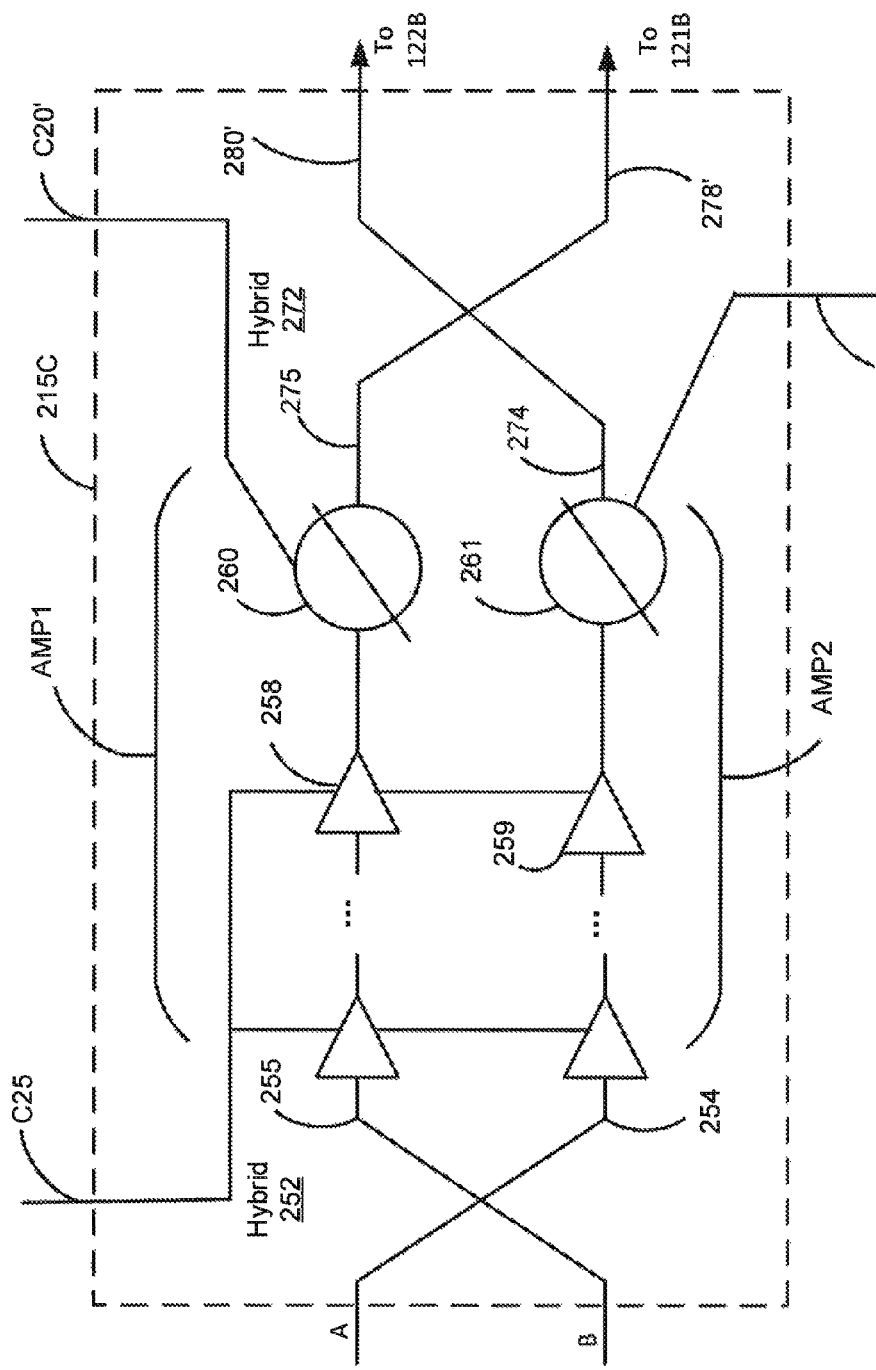
FIG. 2C illustrates a schematic diagram of the input selective low noise amplifier with two outputs.

In FIG. 2C, the antenna signal at the first input A is continuously compared to the reference Load/CAL signal at the second input B to reduce the effect of instabilities in the entire amplification chain (including entire back-end circuits after the detector diode(s)). Both outputs 278 and 280 are amplified and detected by individual diode detectors (i.e., detector 296). By differencing the output signals of the detectors it is possible to cancel out the RF systems 1/f noise where f is a frequency. Repetitive measurements taken by the back-end processing circuits extracts the amplified RF input signal.

In an embodiment, a 50% duty cycle can be assigned so that the system 200 separately integrates both the scene and load selections and provides a subsequent comparison. This "difference", with respect to the known load temperature of the Dicke reference load 230, facilitates characterization of the scene data.

FIG. 2C illustrates a schematic diagram of the input selective low noise amplifier (LNA) 215C with two outputs 278' and 280'. The LNA 215C is balanced and switchless similarly to LNA 215B with dual parallel amplifier channels. Therefore, the differences will be described. LNA 215C is configured for use with radiometer channels $110B^1$ . . . $110B^X$ of FIG. 1B where two output 278' and 280' correspond to outputs O1 and O2. In the embodiment of LNA 215C, the load Z1 and matched termination load port 282 are removed. In a similar manner as described in relation to FIG. 2B, the phase bit 260 would be controlled to adjust the phase of the signals at the first input A and the second input B for the modes described above in relation to FIG. 1B, the modes being the calibration mode, the continuous total power radiometer mode and a differential Dicke radiometer mode. LNA 215C includes a second phase bit 261 which may be controlled by the computing device 250 via control line C21'. Adjusting the phases of the signals via phase bit 261 from the at least one amplifier 259 allows signals from first input A and/or second input B to be presented to output 280'.

Calibration Process

The processes described herein include functions or acts that may be carried out in the order as shown, in a different order or contemporaneously. One or more of the functions or acts may be omitted and additional functions or acts may be added.

Figure 3:
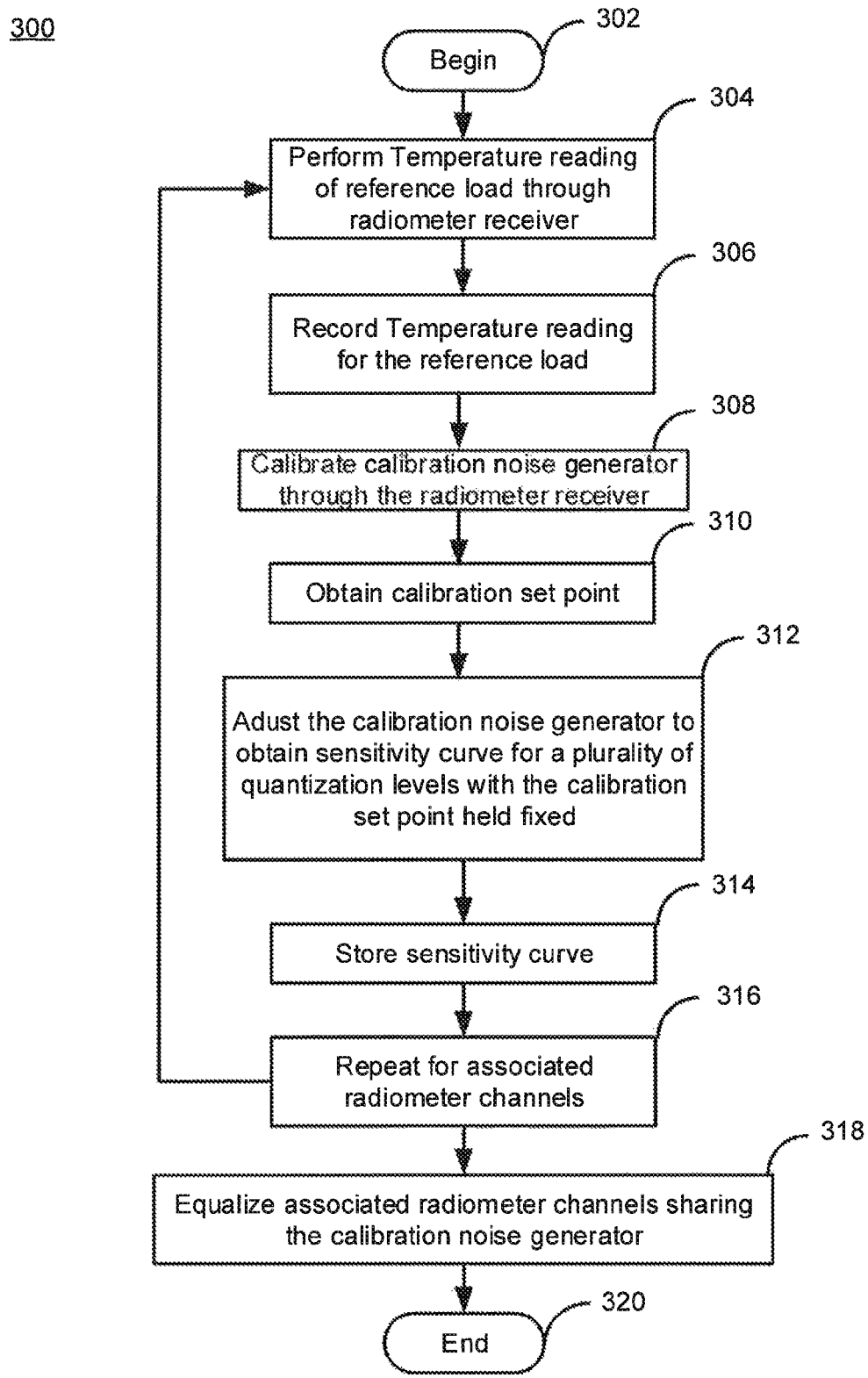
FIG. 3 illustrates a flowchart of the block diagram of the calibration process.

Referring now to FIG. 3, a flowchart of the block diagram of the calibration process 300 is shown. The process 300 begins at 302. The process 300 will be described in relation to the dynamic multi-mode radiometer system 200 of FIG. 2A. The calibration process 300 performs a temperature reading, at block 304, through the radiometer receiver 220 when switch SW is switched to node B1 coupled to the reference load 230. At block 306, the temperature reading for the radiometer receiver 220 is recorded or saved. The calibration process 300 then calibrates the calibration noise generator 240 to the reference load 230 to obtain a calibration set point, at block 310, through the radiometer receiver 220. At block 312, the calibration noise generator 240 is adjusted to obtain a sensitive curve for a plurality of quantization levels with the calibration set point held fixed. In an embodiment, the adjustment may be in a function of quantization levels. At block 314, the sensitivity curve is stored for the radiometer receiver 220. The process is repeated at block 316. As can be appreciated, the steps 302, 304, 306, 308, 310, 312 and 314 may be performed simultaneously (or in a sequence) for those radiometer channels if an array associated with the calibration noise generator 240. For example, one, two, three, four or more radiometer channels may be coupled to the calibration noise generator 240.

Thus, a sensitivity curve is generated for each radiometer receiver of the radiometer channels $110A^1$ ... $110A^X$ (FIG. 1A) or radiometer channels $110B^1$ ... $110B^X$ (FIG. 1B). At block 318, the sensitivity curves may be equalized to the least common denominator response of the associated radiometer channels. In an embodiment, each calibration noise generator 240 may be coupled to and shared by four (4) radiometer channels.

By way of non-limiting example, the sensitivity curve may be expressed as equation (2):

$$Y = Mx + b \qquad \text{Eq. (2)}$$

where x and y are coordinates on a two-dimensional curve; M is the slope and b is the y-intercept. As can be appreciated, other line equations may be used based on the detector response. In the receiver sensitivity line, X is $P_{in}$ and Y is $V_{out}$. Pin is the input of the waveguide to transition coupler 206 and $V_{out}$ is the output voltage of detector 296. The process 300 ends at block 320.

The detector 296 of the radiometer receiver 220 behaves in a linear relationship to the received noise power. In principle, several data points may be taken and each channel is optimized and calibrated. As a result, a line describing the response of the radiometer channel as function of the incoming noise power can be defined by equation (2).

The internal calibrated noise generator 240 includes a CAL analog ATTN 247 which can be controlled to equalize the injected noise temperature to the at least one reference temperature to produce an equalized noise temperature signal once equalization takes place. The CAL digital ATTN 248 is controlled to produce a plurality of quantized attenuated representations of the equalized noise temperature signal.

Figure 4A:
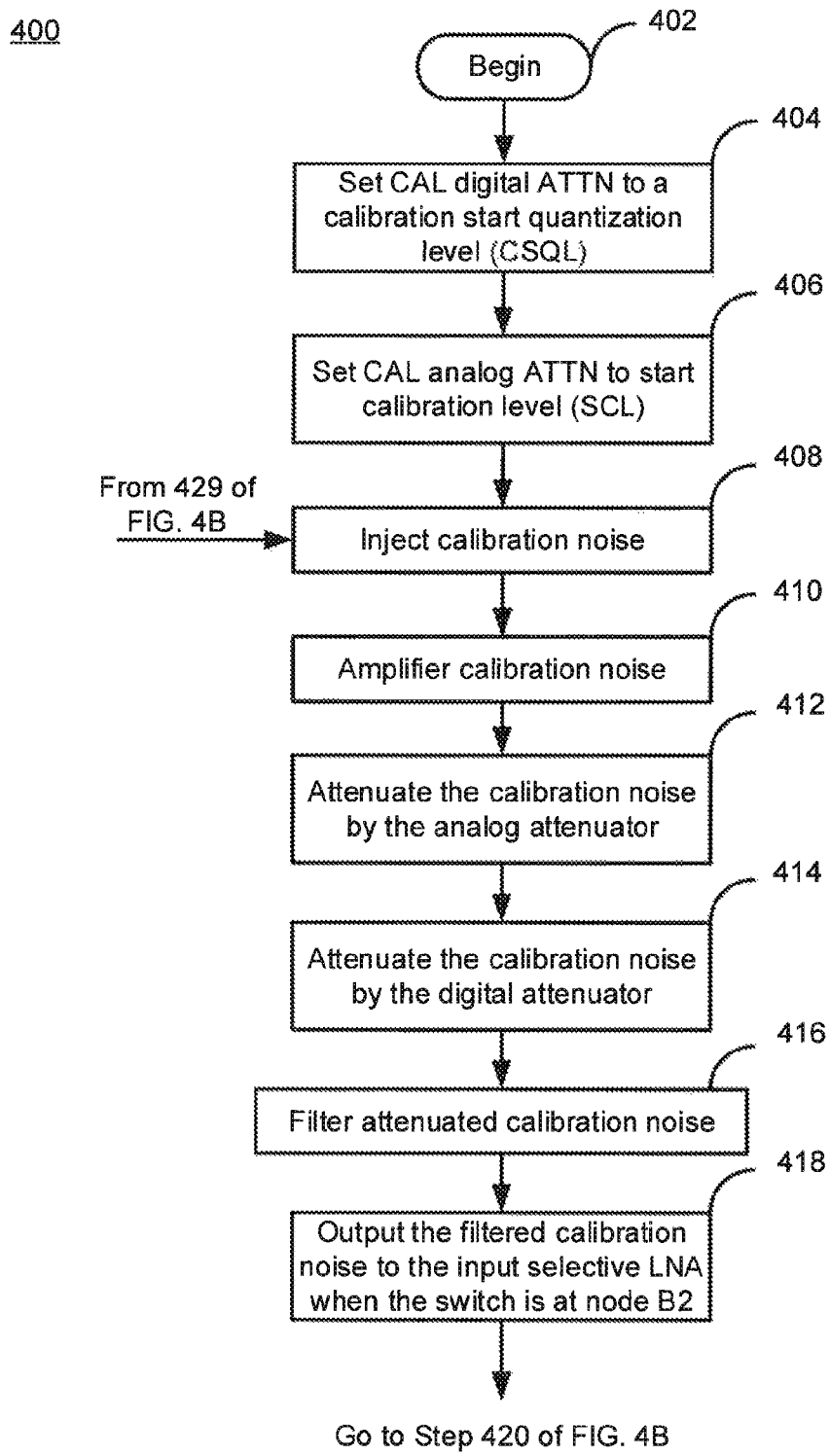
FIGS. 4A and 4B illustrate a flowchart of the process to obtain the calibration set point of the calibration analog attenuator.
Figure 4B:
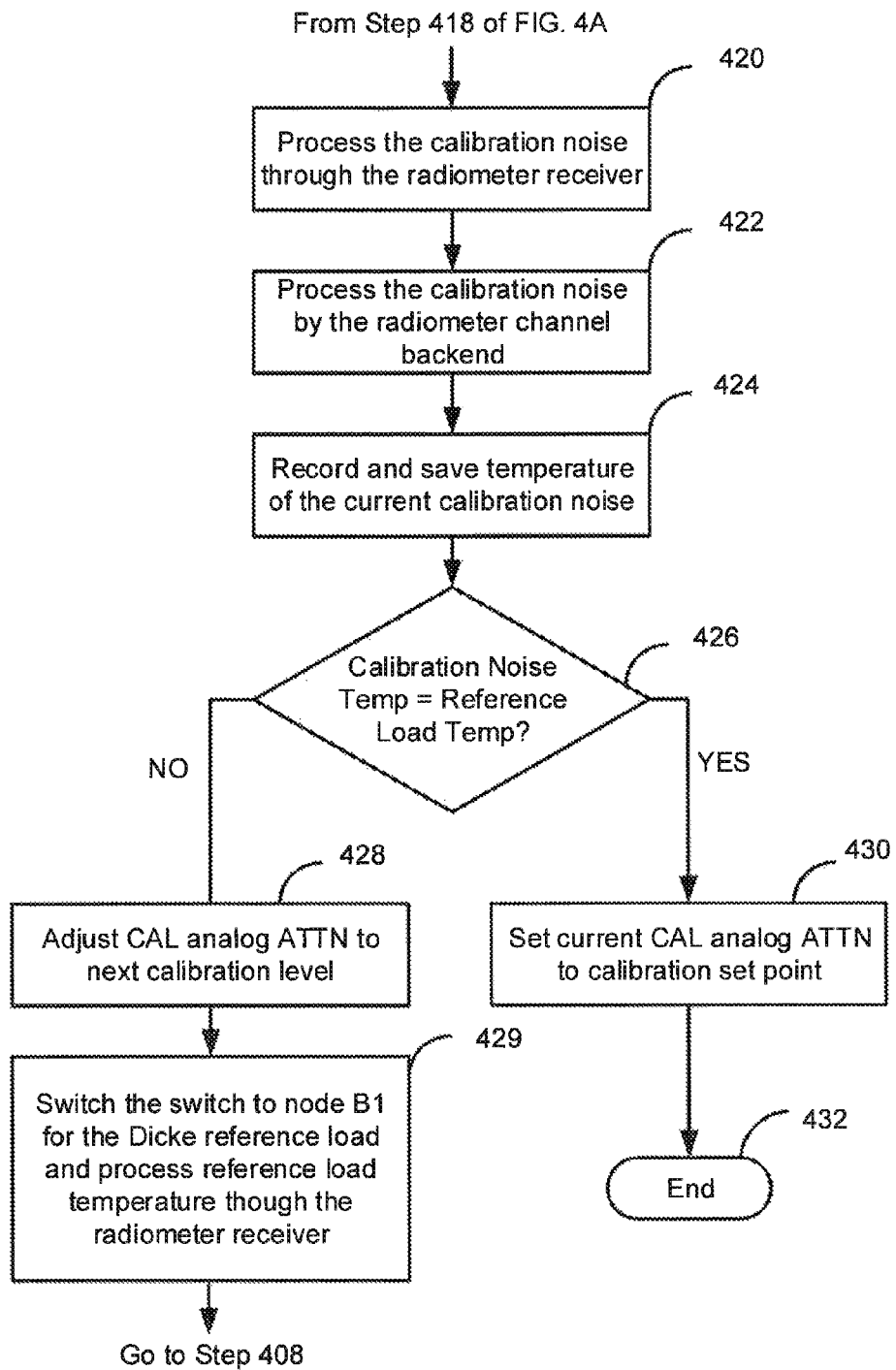

Referring now to FIGS. 4A and 4B, the process 400 for calibrating the calibration noise generator at block 308 to obtain the calibration set point at block 310 will be described. The process 400 begins at block 402. At block 404, the CAL digital ATTN 248 is set to a calibration start quantization level (CSQL). In an embodiment, the calibration start quantization level (CSQL) may be the maximum attenuation setting for the CAL digital ATTN 248. At block 406, the CAL analog ATTN 247 is set to a start calibration level (SCL). At block 408, the noise from the noise source 242 is injected and processed through the CN generator 240. The injected calibration noise signal from noise source 242 may be amplified, at block 410, by at least one amplifier 244 and 246. While two amplifiers are shown one or more amplifiers may be used.

The amplified calibration noise from the at least one amplifier 244 and 246 is processed at block 412 by the CAL analog ATTN 247 using the current attenuation setting. For the first iteration, the current setting is the SCL. At block 414, the attenuated calibration noise is further attenuated using CAL digital ATTN 248. At block 416, the attenuated calibration noise is filtered by filter 249. At block 418, the output from the filter 249 is communicated to the input selective LNA 215 when the switch SW is switched to node B2. The signal from filter 249 is representative of the injected noise temperature.

Referring now to FIG. 4B, at block 420, the calibration noise is processed through the radiometer receiver 220. At block 422, the calibration noise is processed by the radiometer channel backend 225. At block 424, the temperature of the current calibration noise is recorded and saved. At block 426 a determination is made whether the calibration noise temperature is equal to the reference load temperature (See blocks 304 and 306) from reference load 230. If the determination at block 426 is NO, the CAL analog ATTN is adjusted to the next calibration attenuation level. At block 429, the switch SW is switched to node B1 for the Dicke reference load 230 and the reference load temperature is processed though the radiometer receiver 220. Block 429 loops back to block 408 where steps 408, 410, 412, 414, 416, 418 of FIG. 4A and blocks 420, 422, 424, 426, 428 and 429 are repeated until the calibration noise temperature equal the reference load temperature. The switching of switch SW between nodes B1 and B2 is controlled by the computing device 250 and can take place at a number of points in the process. The mention of the switching is for illustrative purposes and should not be limiting to the process 300 or 400.

If the determination, at block 426, is YES, then the current CAL analog ATTN is set to the calibration set point, at block 430. For each iteration, the current temperature of block 424 is updated until the calibration set point is achieved. The calibration set point may be the last saved current temperature at block 424. Hence the calibration set point is obtained. (See block 310 in FIG. 3). The calibration set point should be correlated with the corresponding temperature of the reference load 230. The process for setting the calibration set point of the CAL analog ATTN is ended, at block 432. The CAL analog ATTN 247 can be adjusted in small increments until equalization takes place. By way of non-limiting example, the CAL ATTN 247 can be adjusted in larger incremental steps and then followed by smaller incremental steps as the difference between the calibration noise temperature and the reference load temperature decreases until equality is reached. The attenuation of the CAL analog ATTN 247 is fixed once equalization takes place. Thus, the output form the CAL analog ATTN 247 may be an equalized noise temperature signal being equalized to the reference temperature of the reference load 230. Until recalibration, the CAL analog ATTN 247 may produce the equalized noise temperature signal for quantization by the CAL digital ATTN 248 as described below.

Figure 5A:
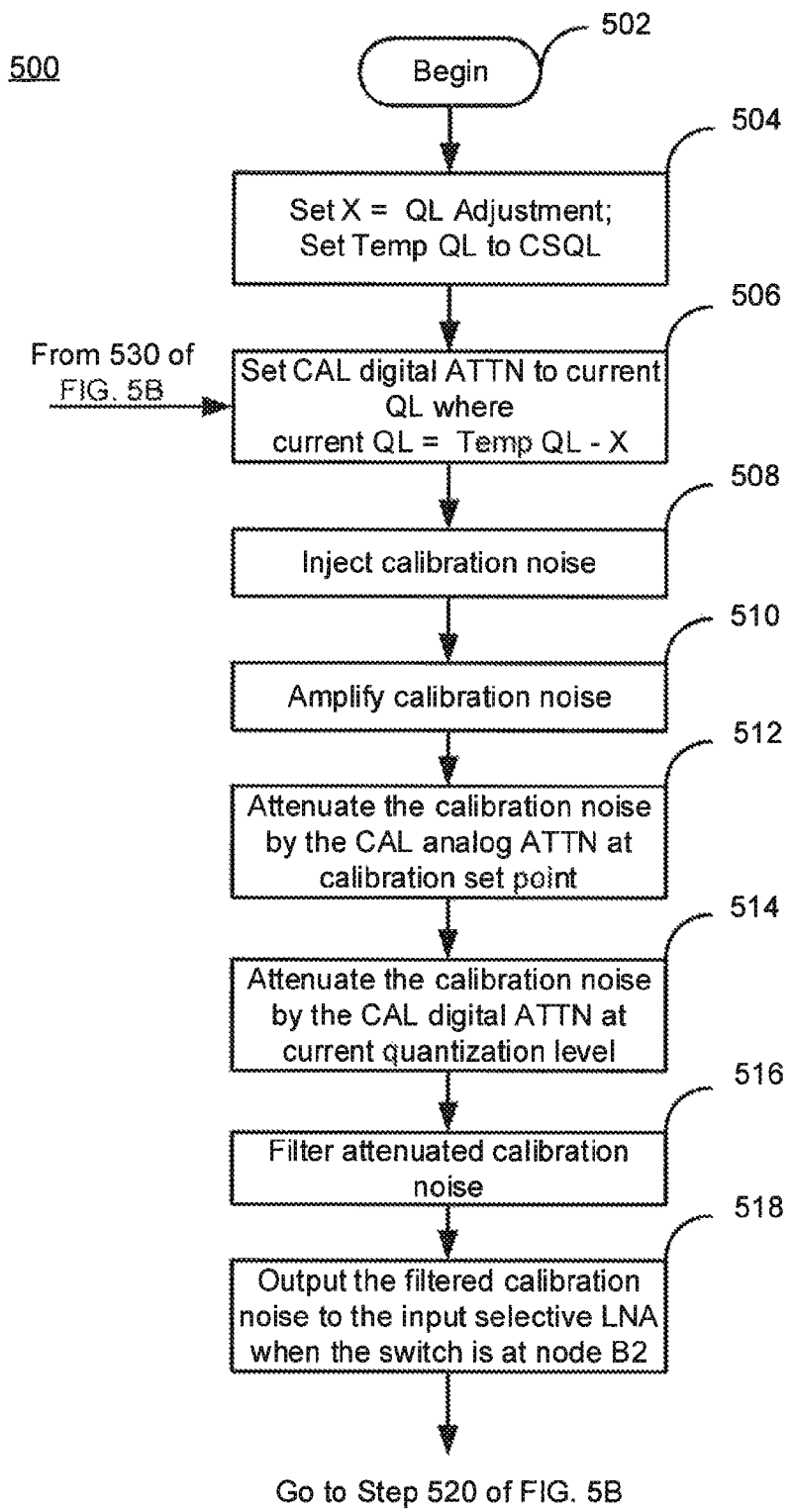
FIGS. 5A and 5B illustrate a flowchart of the process to obtain a sensitivity curve based on a plurality of quantization levels.

The process of block 312 for obtaining the sensitivity curve through quantization levels will now be described in relation to FIGS. 5A and 5B.

The process 500 for obtaining the sensitivity curve through quantization levels at block 312 will be described. The process 500 begins at block 502. At block 504, an adjustment factor X is set equal to a quantization level (QL) adjustment. By way of non-limiting example, the QL adjustment may be 3 dB (decibels). If the CSQL is set to maximum, the QL adjustment decreases the CSQL by a predetermined amount such as, without limitation, 3 dB. Other quantization level adjustment quantities may be used. On the other hand, if a minimum CSQL is used to start the calibration process, the CSQL is incremented by the adjustment factor X. At block 504, a temporary quantization level (Temp QL) parameter is set equal to the starting calibration quantization level (CSQL).

The CAL digital ATTN 248 is set to the current QL at block 506 where the current QL is equal to Temp QL minus the adjustment factor X. At block 508, the noise from the noise source 242 is injected and processed through the CN generator 240. The injected calibration noise from noise source 242 may be amplified, at block 510, by at least one amplifier 244 and 246. While two amplifiers are shown one or more amplifiers may be used.

The amplified calibration noise from the at least one amplifier 244 and 246 is processed, at block 512, where the calibration noise is attenuated by the CAL analog ATTN 247 using the current setting where the current setting is set at the calibration set point. At block 514, the attenuated calibration noise is further attenuated using CAL digital ATTN 248 using the current QL. At block 516, the attenuated calibration noise is filtered by filter 249. At block 518, the output from the filter 249 is communicated to the input selective LNA 215 when the switch SW is switched to node B2.

Figure 5B:
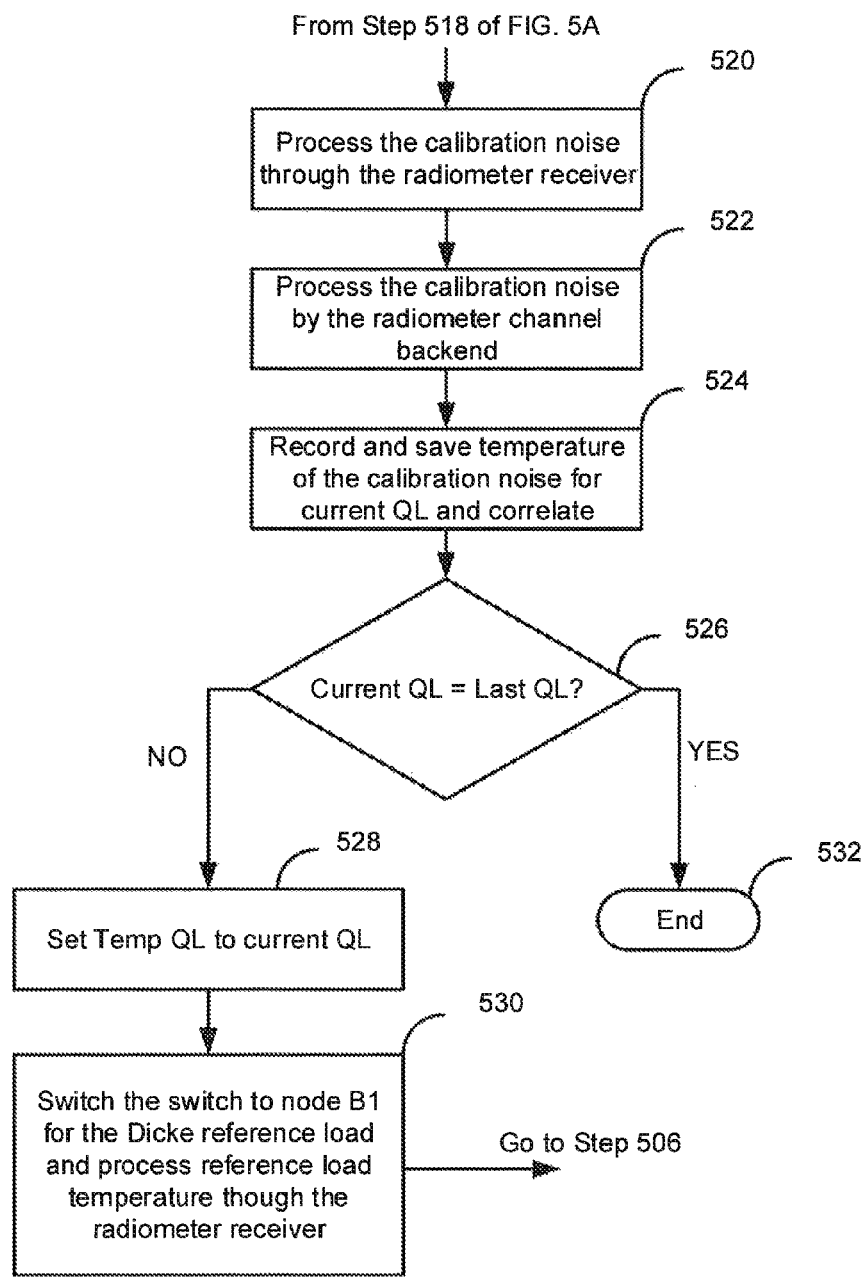

Referring now to FIG. 5B, at block 520, the calibration noise is processed through the radiometer receiver 220. At block 522, the calibration noise is processed by the radiometer channel backend 225. At block 524, the temperature of the calibration noise is recorded and saved. Additionally, the temperature of the calibration noise for the QL is correlated with the reference load 230. At block 526 a determination is made whether the current QL is equal to the last QL. If the determination, at block 526, is NO, the Temp QL is set to the current QL at block 528. At block 530, the switch SW is switched to node B1 for the Dicke reference load 230 and the reference load temperature is processed though the radiometer receiver 220. Block 530 loops back to block 506 where steps 506, 508, 510, 512, 514, 516, 518 of FIG. 5A and blocks 520, 522, 524, 526, 528 and 530 are repeated until the current QL equal the last QL for the CAL digital ATTN 248.

Before, the process repeats at step 506, the temperature of the reference load 230 is obtained by switching switch SW from node B2 to node B1 so that the reference load temperature is processed through the radiometer receiver 220 and radiometer channel backend 225. The switching of switch SW can take place at a number of points in the process 500. The mention of the switching between nodes B1 and B2 is for illustrative purposes and should not be limiting to the process 500.

If the determination, at block 526, is YES, then the process 500 ends at block 532 and the sensitivity curve is obtained for all quantization levels. The CAL digital ATTN 248 may be controlled to produce a plurality of quantized attenuated representations of the equalized noise temperature signal to produce the sensitivity curve.

The quantized level of the CAL digital ATTN 248 is changed by an incremental amount. By way of non-limiting example, the CAL digital ATTN 248 may be decremented by 3 dB. However, other incremental amounts may be utilized depending on the number of reference points on the sensitivity curve. The smaller the decrement, the more sample points may be generated. While larger incremental amounts may generate less number of sample points. The use of parameters such as the quantization level (QL) adjustments, and temporary quantization level (QL) are for illustrative purposes to depict that the current QL is adjusted in increments for each new iteration. In software, this can be carried out in a variety of ways.

In an embodiment, the number of quantized levels of the CAL digital ATTN 248 may be a function of 2N. The number of sample point on the sensitivity curve may be 2N.

For each quantized level of the CAL digital ATTN 248, the output calibration voltage is stored and recorded with the corresponding output voltage of the Dicke reference load 230.

Figure 6:
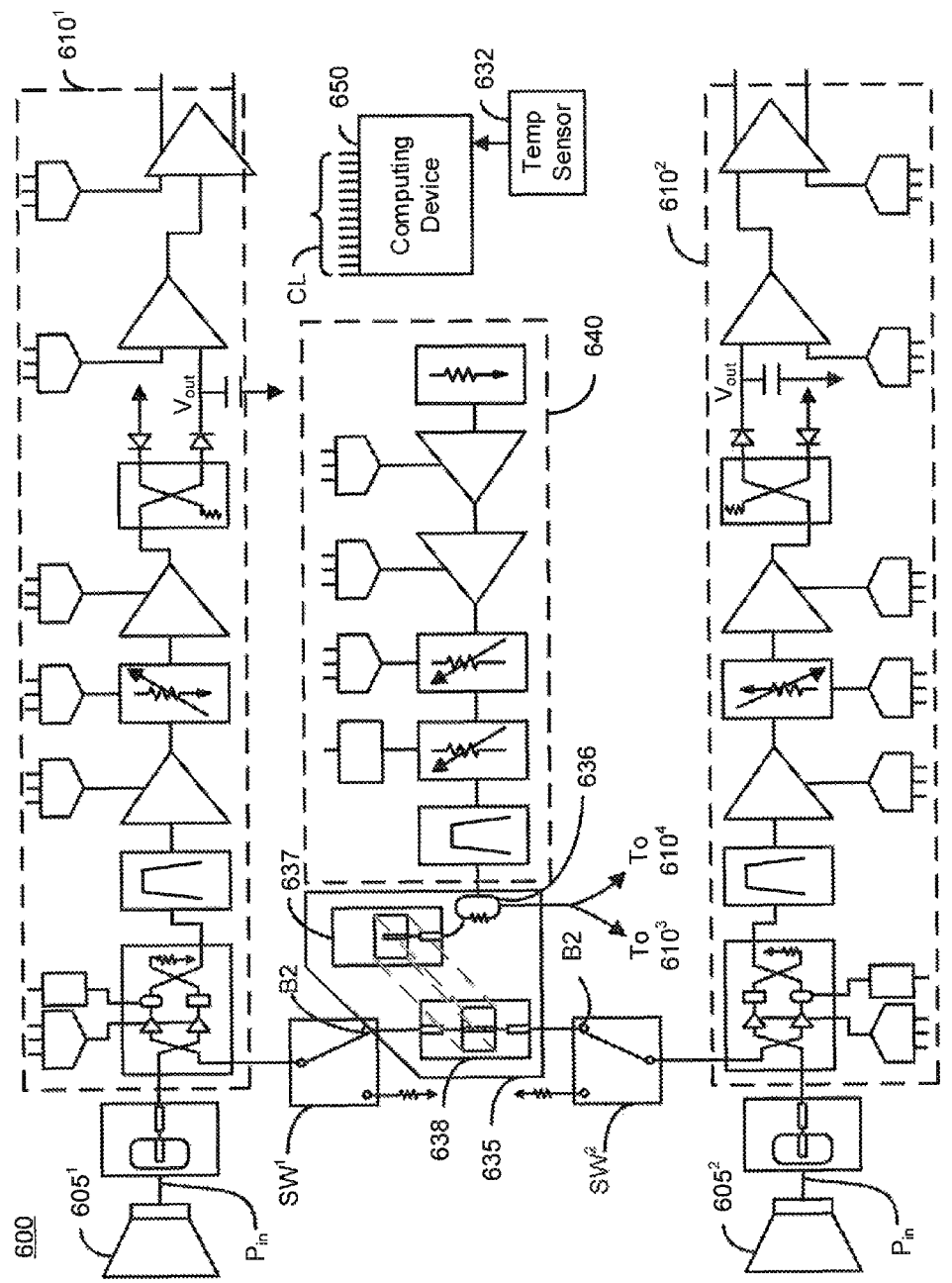
FIG. 6 illustrates a schematic diagram of a dynamic multi-mode radiometer system with an array of radiometer channels.

Referring now to FIG. 6, a schematic diagram of a dynamic multi-mode radiometer system 600 is shown with an array of radiometer channels $610^1$ and $610^2$ (only two channels are illustrated) coupled to antenna $605^1$ and $605^2$, respectively. The array includes output lines to radiometer channels $610^3$ and $610^4$ which are essentially identical to channels $610^1$ and $610^2$ and are not shown. System 600 may include a computing device 650 having a plurality of control lines CL. The control lines CL control the common calibration noise generator 640 and radiometer channels $610^1$ and $610^2$ and radiometer channels $610^3$ and $610^4$ in a manner as described in relation to FIG. 2A. In the embodiment, the switches $SW^1$ and $SW^2$ are shown simultaneously tied to node B2 (FIG. 2A). The calibration channel interface 635 includes a transition coupler 638 coupled to both switches $SW^1$ and $SW^2$. A splitter 636 may be coupled to a transition coupler 637, where transition coupler 637 may be coupled to transition coupler 638. The output from the splitter 636 coupled to the transition coupler 637 and then to transition coupler 638 may be mirrored for radiometer channels $610^3$ and $610^4$ There may be a connection shown in dashed lines between the transition coupler 637 and transition coupler 638. The common calibration noise generator 640 may be arranged on a different board or layer of the integrated circuit assembly for the radiometer channels but may reside in the same housing or surrounding packaging. Thus, a connection to the switch is needed. The connection represented in dashed lines may be a waveguide. The transition couplers 637 and 638 may be a waveguide to microstrip transition.

The dynamic multi-mode radiometer system 600 includes temperature sensor 632. In an embodiment, the radiometer channels $610^1$, $610^2$, $610^3$ and $610^4$ and common calibration noise generator 640 may be in the same physical housing (hereinafter referred to as a "quad-housing"). The temperature sensor 632 may record the temperature in the quad-housing (not shown). The physical housing may include one or more radiometer channels and is not limited to four.

The calibration process 300 (FIG. 3) and processes 400 and 500 are essentially the same for each of the radiometer channels $610^1$, $610^2$, $610^3$ and $610^4$ across the array. The calibration processes may be carried out simultaneously for each of the radiometer channels $610^1$, $610^2$, $610^3$ and $610^4$ across the array. Once, the "calibration set point" has been established the CAL digital attenuator can be reduced in digitally quantized steps corresponding to known temperature changes. The different calibration temperatures presented facilitate characterization of the $P_{in}$ versus $V_{out}$. Over time, long wave temperature effects will degrade the calibration state of the system 600. Thus, the system 600 can be recalibrated without suspension of the mission. One or more components of the array may be a monolithic microwave integrated circuit (MMIC). One or more of the components of the calibration noise generator 640 may be a MIMIC.

In an embodiment there is a plurality of radiometer channels, each being dynamically controlled for multiple modes of operation. The plurality of radiometer channels may be coupled to a single calibration channel (i.e., the common calibration noise generator 640) so that the plurality of radiometer channels may be calibrated using the same calibration channel components. The use of the same calibration channel components may serve to reduce offsets between equipment tolerances and variations.

Figure 7:
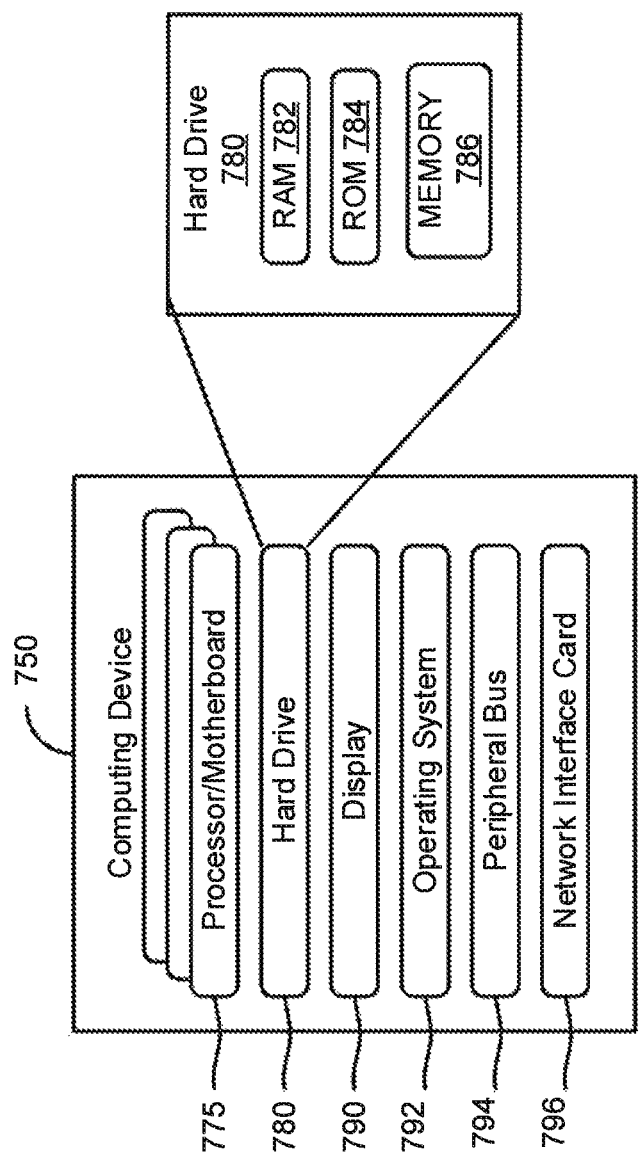
FIG. 7 illustrates a block diagram of a computing device.

Referring now to FIG. 7, in a basic configuration, the computing device 750 may include any type of stationary computing device or a mobile computing device. Computing device 750 may include one or more processors 775 and system memory in hard drive 780. Depending on the exact configuration and type of computing device, system memory may be volatile (such as RAM 782), non-volatile (such as read only memory (ROM 784), flash memory 786, and the like) or some combination of the two. System memory may store operating system 792, one or more applications, and may include program data for performing processes 300, 400 and 500. The computing device 750 may carry out one or more blocks of processes 300, 400 and 500. Computing device 750 may also have additional features or functionality. For example, computing device 750 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 750 may also include or have interfaces for input device(s) (not shown) such as a keyboard, mouse, pen, voice input device, touch input device, etc. The computing device 750 may include or have interfaces for connection to output device(s) such as a display 790, speakers, etc. The computing device 750 may include a peripheral bus 794 for connecting to peripherals. Computing device 750 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 750 may include a network interface card 796 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an" and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
    a radiometer channel including an input selective low noise amplifier (LNA) and a radiometer receiver, the LNA comprising a first input and a second input and an output coupled to the radiometer receiver;
    an antenna coupled to the first input of the LNA;
    a reference load coupled to the second input of the LNA and configured to produce a first signal representative of a reference temperature; and
    an internal calibrated noise (ICN) generator selectively connected to the second input of the LNA and having an internal noise source for producing a second signal representative of an injected noise temperature, the ICN generator being configured to calibrate the radiometer receiver as a function of the injected noise temperature equalized to the reference temperature.

2. The system of claim 1, wherein the ICN generator comprises:
    an analog attenuator controlled to equalize the injected noise temperature to the reference temperature to produce an equalized noise temperature signal; and
    a digital attenuator configured to produce a plurality of quantized attenuated representations of the equalized noise temperature signal.

3. The system of claim 1, wherein the radiometer channel comprises another radiometer receiver; and the LNA comprises a second output coupled to said another radiometer receiver.

4. The system of claim 1, further comprising a switch comprising:
    a first input node coupled to the reference load;
    a second input node coupled to the ICN generator; and
    an output coupled to the second input of the LNA.

5. The system of claim 1, further comprising a computing device operable to control the radiometer channel to output only scene data from the antenna at the output of the LNA when in a total power radiometer mode; and to output synchronized signals of the scene data from the antenna and the first signal from the reference load during a Dicke mode.

6. The method of claim 5, wherein the LNA is a balanced switchless LNA with parallel amplifier channels with at least one amplifier channel controlled to generate the first signal and the second signal at the second output of the LNA at different phases.

7. The system of claim 1, further comprising an array, wherein the array comprises:
    a plurality of radiometer channels, each radiometer channel having coupled thereto an associated antenna and an associated reference load wherein the internal calibrated noise generator is shared by the array.

8. A method comprising:
    providing a radiometer channel including an input selective low noise amplifier (LNA) and a radiometer receiver, the LNA comprising a first input and a second input and an output coupled to the radiometer receiver;
    coupling an antenna to the first input of the LNA;
    coupling selectively a reference load to the second input of the LNA to produce a first signal representative of a reference temperature; and
    coupling selectively an internal calibrated noise (ICN) generator to the second input of the LNA, the ICN generator having an internal noise source for producing a second signal representative of an injected noise temperature; and
    calibrating the radiometer receiver as a function of the injected noise temperature equalized to the reference temperature.

9. The method of claim 8, wherein the calibrating comprises:
    controlling an analog attenuator to equalize the injected noise temperature to the reference temperature to produce an equalized noise temperature signal; and
    quantizing at different attenuation levels the equalized noise temperature signal to produce a plurality of quantized attenuated representations of the equalized noise temperature signal.

10. The method of claim 9, further comprising:
    coupling to the radiometer channel another radiometer receiver wherein the LNA comprises a second output coupled to said another radiometer receiver;
    continuously receiving scene data at said radiometer receiver via the LNA; and
    selectively receiving the first signal and the second signal at said another radiometer receiver via the LNA.

11. The method of claim 10, wherein the LNA is a balanced switchless LNA with parallel amplifier channels and further comprising:

controlling at least one amplifier channel of the parallel amplifier channels to generate the first signal and the second signal at the second output of the LNA at different phases.

12. The method of claim 8, further comprising controlling, by a computing device, the radiometer channel to output only scene data from the antenna at the output of the LNA when in a total power radiometer mode and to output synchronized signals of the scene data from the antenna and the first signal from the reference load during a Dicke mode.

13. A system comprising:
a plurality of radiometer channels, each radiometer channel including an input selective low noise amplifier (LNA) and a radiometer receiver, the LNA comprising a first input and a second input and an output coupled to the radiometer receiver;
a plurality of antennas, a respective one antenna coupled to the first input of the LNA of a corresponding radiometer channel;
a plurality of reference loads, a respective one reference load coupled to the second input of the LNA of the corresponding radiometer channel, the respective one reference load configured to produce a first signal representative of a reference temperature; and
an internal calibrated noise (ICN) generator selectively connected to the second input of the LNA of each radiometer channel of the plurality of radiometer channels, the ICN generator having an internal noise source for producing a second signal representative of an injected noise temperature and being configured to calibrate the radiometer receiver of each radiometer channel as a function of the injected noise temperature equalized to the reference temperature.

14. The system of claim 13, wherein the ICN generator comprises:
an analog attenuator controlled to equalize the injected noise temperature to the reference temperature of said each radiometer channel to produce an equalized noise temperature signal for said each radiometer channel; and
a digital attenuator configured to produce a plurality of quantized attenuated representations of the equalized noise temperature signal for said each radiometer channel.

15. The system of claim 13, wherein said each radiometer channel comprises another radiometer receiver; and each LNA comprises a second output coupled to said another radiometer receiver of the corresponding radiometer channel.

16. The system of claim 13, further comprising a plurality of switches, each switch of the plurality of switches being coupled to an associated radiometer channel comprising:
a first input node coupled to the reference load of the associated radiometer channel;
a second input node coupled to the ICN generator; and
an output coupled to the second input of the LNA of the associated radiometer channel.

17. The system of claim 13, further comprising a computing device operable to control the plurality of radiometer channels to output only scene data from the plurality of antennas at the output of the LNA of said each corresponding radiometer channel when in a total power radiometer mode; and to output synchronized signals of the scene data from the plurality of antennas and the first signal from the reference load associated with said each corresponding radiometer channel during a Dicke mode.

18. The system of claim 17, wherein the LNA is a balanced switchless LNA with parallel amplifier channels with at least one amplifier channel controlled to generate the first signal and the second signal at the second output of the LNA at different phases.

19. The system of claim 13, further comprising a plurality of arrays, each array comprising:
the plurality of radiometer channels, the plurality of antennas, a plurality of reference loads and the ICN generator.

20. The system of claim 19, wherein the plurality of radiometer channel comprises four radiometer channels wherein the ICN generator is shared by the plurality of radiometer channels of an array.

* * * * *